(12) United States Patent
Schmidt De Andrade

(10) Patent No.: US 6,389,263 B1
(45) Date of Patent: May 14, 2002

(54) ROAD RADIO CELLULAR SYSTEM

(75) Inventor: Erick Sergio Schmidt De Andrade, Nelo Horizonte (BR)

(73) Assignee: Howell Laboratories, Inc., Bridgton, ME (US)

( * ) Notice: Subject to any disclaimer, the term of this patent is extended or adjusted under 35 U.S.C. 154(b) by 0 days.

(21) Appl. No.: 09/110,346

(22) Filed: Jul. 6, 1998

(51) Int. Cl.[7] .................................................. H04B 7/15
(52) U.S. Cl. ............................ 455/11.1; 455/16; 455/20; 455/93
(58) Field of Search ................................ 455/404, 11.1, 455/7, 16, 20, 22, 25, 70, 66, 93, 142; 340/905

(56) References Cited

U.S. PATENT DOCUMENTS

| | | | |
|---|---|---|---|
| 4,539,706 A | * 9/1985 | Mears et al. ............... | 455/11.1 |
| 5,081,703 A | * 1/1992 | Lee ............................... | 455/23 |
| 5,280,632 A | * 1/1994 | Jung-Gon .................... | 455/70 |
| 5,847,663 A | * 12/1998 | Chasek ........................ | 455/70 |

* cited by examiner

*Primary Examiner*—Nguyen Vo
(74) *Attorney, Agent, or Firm*—Samuels, Gauthier & Stevens

(57) ABSTRACT

The present invention is related to a system which comprises a number of transmitting microcells sequentially disposed and integrated along the road. The system developed, the aim of which is helping drivers by supplying them with useful information on the route they shall follow, comprises a number of repeating stations wherein each of them is provided with a "Fi" frequency receiving antenna which is interconnected to a "Fi" frequency transceptor for "FM", and the latter is interconnected to a 87.9 Mz directional antenna through low loss cables.

11 Claims, 3 Drawing Sheets

ROAD RADIO CELLULAR SYSTEM

FIELD OF THE INVENTION

This invention refers to a system comprising a number of transmitting microcells sequentially disposed and integrated along the road.

More specifically, this invention refers to a system for carrying out communication between "n" transmission sites which are conveniently distributed along the road to provide the drivers with useful information concerning the traffic conditions and/or others.

BACKGROUND OF THE INVENTION

At present, there are no specialized road radio services in the market for helping drivers by supplying them with useful information on the route they shall follow.

Such a service shall therefore serve as a communication means among road operators, patrolmen, mechanical and personal help services operators, and the like, frequently required in all municipal, state and federal roads.

Thus, the object of this invention is to provide then a road radio type communication system for supplying the users of said road with useful information through the radios of their own vehicles.

SUMMARY OF THE INVENTION

According to the present invention, a system for distributing signals in confined areas, such as a road, is provided, which system comprises the transmission of sound through transmitting microcells sequential and conveniently integrated and disposed along the road, including access areas and neighbor areas. This coverage is restricted to distances of up to 300 or 500 meters transversal to the road axis, so that the service is limited only to the assistance of users in a specific way. The cells have a pattern linear coverage of up to approximately 2.5 km which can be extended up to approximately 20 km on basis of the planar topography of the road and by potency adjustment of the transmitter of each cell.

The transmitting microcells according to this invention allow for the reception of frequency modulated signals in common receiving radios of the vehicles that drive along the road. Such a reception shall be monotonally performed (music and voice) by 36KOF3EJN modulation process which can be changed by the addition of coded signals to be also transmitted for eliminating at consistent levels the interference effects and interaction among adjacent microcells and/or those alternately disposed on the road.

The transmitting microcells according to this invention shall operate in the 87.9 MHz frequency range which can even be defined for this type of service all over the country. It can also operate at FM frequency range which can be attributed to the type of service.

Every transmitting microcell is actuated by a "Fi" frequency for repeating and distributing the information signal, which frequency cannot be directly tuned by the common receiving radios of the vehicles, and takes the information to be directly retransmitted and/or repeated by transmitting microcells to the users along the road. The number of "Fi" frequencies to be used depends on the area topography where the road is constructed and the different signal levels able to actuate the transmitting microcells.

The geographical location of the stations transmitting different "Fi" frequencies is defined for every road as a function of the coverage of "n" transmitting microcells disposed along thereof. These same repeating stations shall be directly linked among one another and/or by satellite, thus allowing for a full integration of the information for specific portions or for the extension of the road with the likelihood of an integration all over the country as well.

BRIEF DESCRIPTION OF THE DRAWINGS

The Figures illustrates a preferred embodiment of the inventive road radio cellular system which however must not be considered as a limitation to the spirit and scope thereof. Said Figures are as follows.

DETAILED DESCRIPTION OF THE INVENTION

Figure 1:
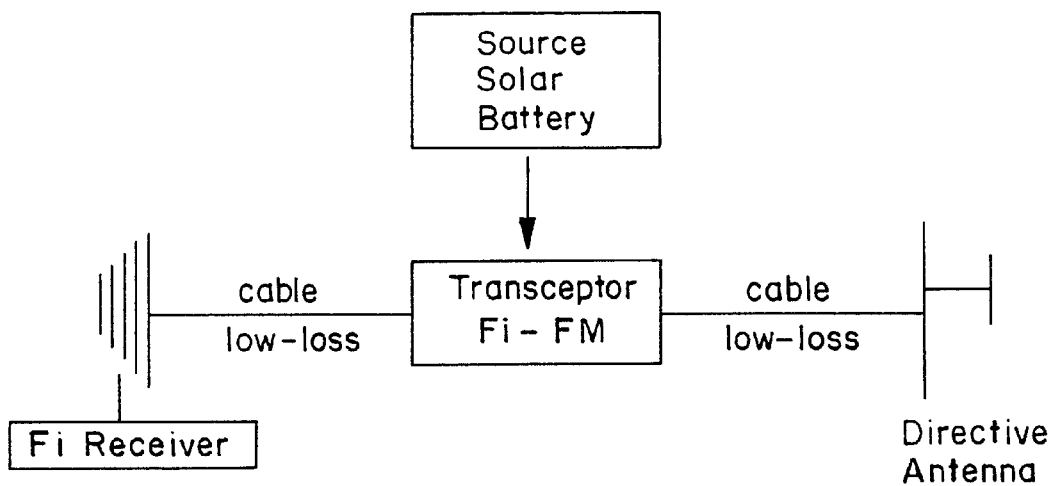
FIG. 1—block diagram of a transmitting microcell pertaining to the road radio cellular system of the invention.

The FIG. 1 shows the inventive road radio cellular system comprising a number of repeating stations, each of them being provided with a "Fi" frequency receiving antenna which is interconnected to a Fi/FM frequency transceptor, and the latter is interconnected to a 87.9 MHz directional antenna through low loss cables.

Figure 2:
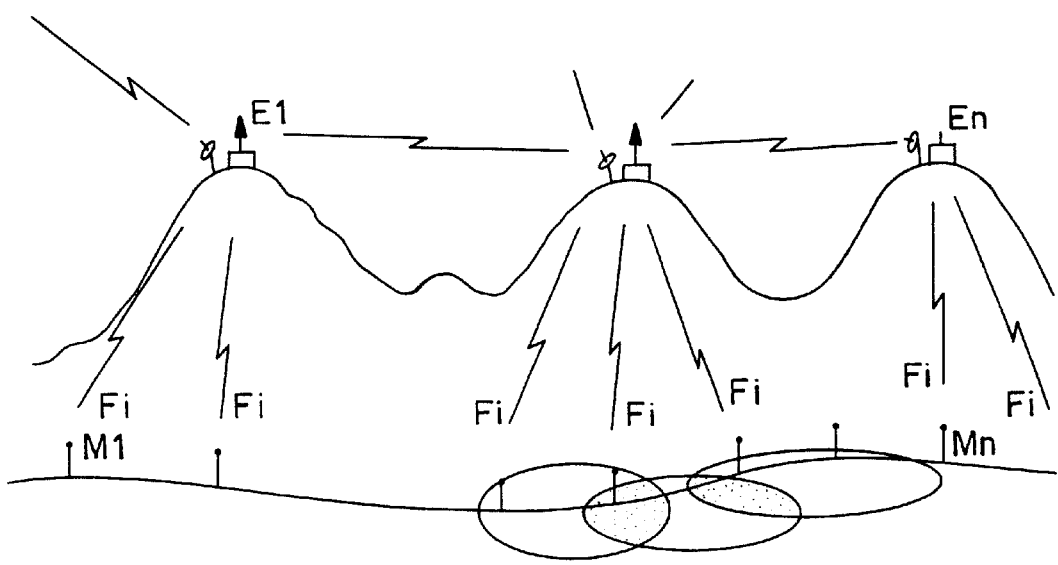
FIG. 2—schematic view of the inventive road radio cellular system showing signal distributing stations and transmitting microcells disposed along a road.
Figure 3:
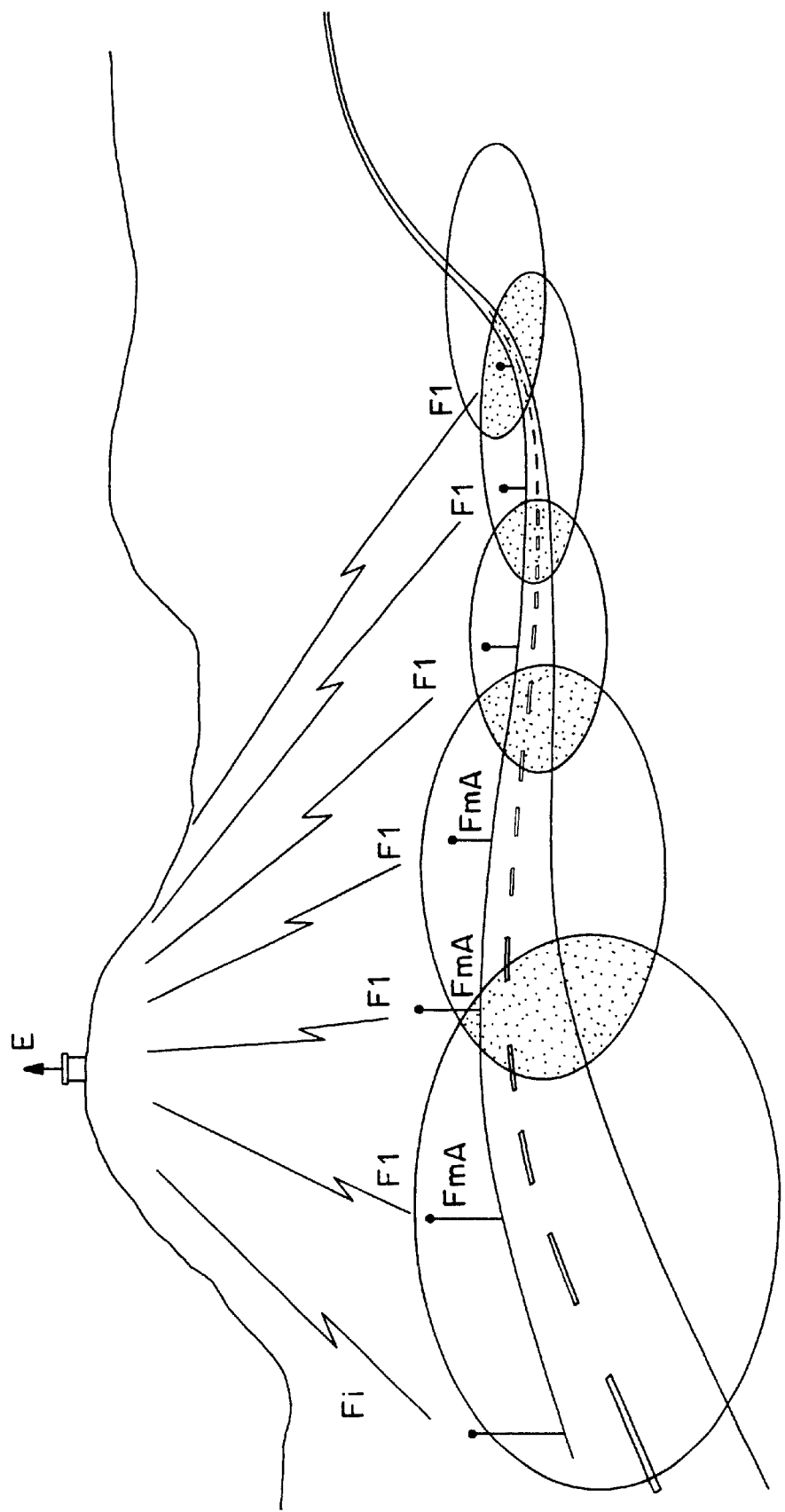
FIG. 3—schematic view of the inventive road radio cellular system showing the transmission beams and eventual transition areas.

More specifically in FIGS. 2 and 3, the inventive road radio cellular system is shown through a number of repeating stations E1–En that receive signals by satellite and/or cable retransmitting them to the transmitting microcells M1–Mn. Said transmitting microcells are comprised of a transceptor having a "Fi" input and an 87.9 MHz output or another frequency attributed in the FM range, a receiving antenna within the "Fi" frequency range of different types to be defined by the local reception level in every site, an antenna with directional diagram vertically polarized for transmitting within the 87.9 MHz range, a solar battery for feeding the system which can also optionally make use of the common electric supply and low loss coaxial cables for interconnecting the different components of the microcells.

The components of the road radio cellular system of the present invention shall be integrally assembled on frames which can be or not made of metal with a height of approximately 30 meters, allowing for the partial coverage of portions of the road and other areas of interest as already explained above.

As an example, the several components of the inventive road radio cellular system can be provided with the following technical features:

a Log periodical Yagi "Fi" receiving antenna preferably operating within the 220 MHz range;

coaxial cables that respectively connect the "Fi" receiving antennas and the FM transmitting antenna commercially available having low loss characteristics;

a solar power source feeding a transceptor as the frequently used in communication devices with a 74 hour application time for 700 mW power;

a "Fi"/"FM" transceptor that receives "Fi" frequency signals sent by repeating stations and transmits same at a frequency which can be tuned in FM receivers, with specific features for this purpose;

directional antennas that transmit the 87.9 MHz FM frequency with specific maximum irradiation features. Optionally, Yagi antennas can be used in cases where a higher height and a higher wind load are possible.

As a whole, the road radio cellular system according to the present invention has intrinsic features associated to the "Fi"/"FM" transceptor, and the directional antennas, the latter ones being the object of a patent application filed by the present applicant.

Each transmitting microcell of this invention uses:

reduced power for making it possible to use the solar energy as the only feeding source during consistent periods of time, in relation to most of the "n" transmitting microcells;

reduced power for minimizing eventual interfering signals from overlapped bundles of antennas among immediately adjacent cells and/or those alternatively provided along the road;

reduced power that matches the topographic profile of each road portion as a function of the different propagation features along its bed, by considering such factors as temperature, unity of natural and/or artificial obstructions (viaducts, bridges, metallic structures, etc.) that may affect the propagation of the transmitted signal;

reduced power that matches the type of road traffic, specially in the case said traffic encompasses large vehicles provided with metallic bodies.

The heights of the transmitting microcell units in the relevant supporting structures shall be defined as a function of the above also considering the propagation study for each of the road micro zones, thus allowing for a as little as possible reduction in the number of microcells for cost reasons.

With regard to the transceptors used in the road radio cellular system of the invention, by way of example, its main characteristic is that they are receivers operating in the "Fi" frequency range coupled to transmitters operating in the 87.9 MHz range and/or another frequency to be allocated to the service, wherein each unity should be provided with (i) continuous operational adjustment of power from 0 to 750 mW; (ii) carrier deviation with a ±200 KHz step adjustment for reducing the eventual interference between neighbor cells without hampering the reception in receiving radios; and (iii) introduction of a sub-carrier consistent with the system so that the highest intensity signal can automatically be the prevailing one.

In addition, as an example, the transceptor of this invention may have the following specification:

| (i) for the receiver: | |
| --- | --- |
| Reception | (140–220) MHz, digitally programmed |
| Sensitivity | 0.5 μv/m for 20 db |
| Type | narrow band |
| Emphasis | 75 μsec |
| Audio | (100–5,000) Hz 1 db |
| Impedance | 50 ohms |
| (ii) for the transmitter: | |
| Frequency | (87.5–108.0) MHz, digitally programmed |
| Response | (100–5,000) Hz |
| Output impedance | 50 ohms |
| Input | 12.5 v |

| -continued | |
| --- | --- |
| Power | (0–750) mW, continually adjustable |
| Spurious | better than <50 db |
| Temperature | from −40° C. to 50° C. |

The directional antennas specifically developed to be used in the present road radio cellular system may preferably show the following features:

a directional passive excitation antenna type;

a vertical linear biasing;

a directional type irradiation diagram in the horizontal plane in such a way that the antenna supporting structure itself is integral with the antenna;

a reduced dimension in terms of wavelength fractions associated with a tough construction, low wind load and mechanical characteristics of toughness defined as a function of probable remote installation sites;

a front-back rejection of at least 14 db;

the opening angles in the horizontal and vertical planes consistent with the process in view of the use thereof.

The road radio cellular system of the present invention also comprises the use of Yagi type conventional antennas and the like. However, the physical sizing of such antennas requires larger mechanical structures and obviously its use is thoroughly viable in some transmitting microcells.

In the antenna art, the gain is defined by the formula:

$$G = \mu D$$

wherein:

$G$ = gain of the antenna with relation to the ½ wave dipole;

$D$ = directivity;

$\mu$ = efficiency.

It should also emphasized that an efficiency in the order of 0.95 to 0.99 is sought when designing antennas, which efficiency is attained for dimensions close to half the wavelength given by 300/f, wherein f is the operating frequency in MHz.

For antennas having a small size in terms of wavelength, the directivity represented by directional diagrams in the horizontal and vertical planes can be attained, but the efficiency is reduced to values close to 0.2 up to 0.5 of the wavelength. The use of the present system corresponds to the coverage of smaller areas, provided that G gain defined above is close to 6.0 decibels with relation to a half-wave dipole.

The other components of the present road radio cellular system are usually found in the specialized market.

Figure 4:
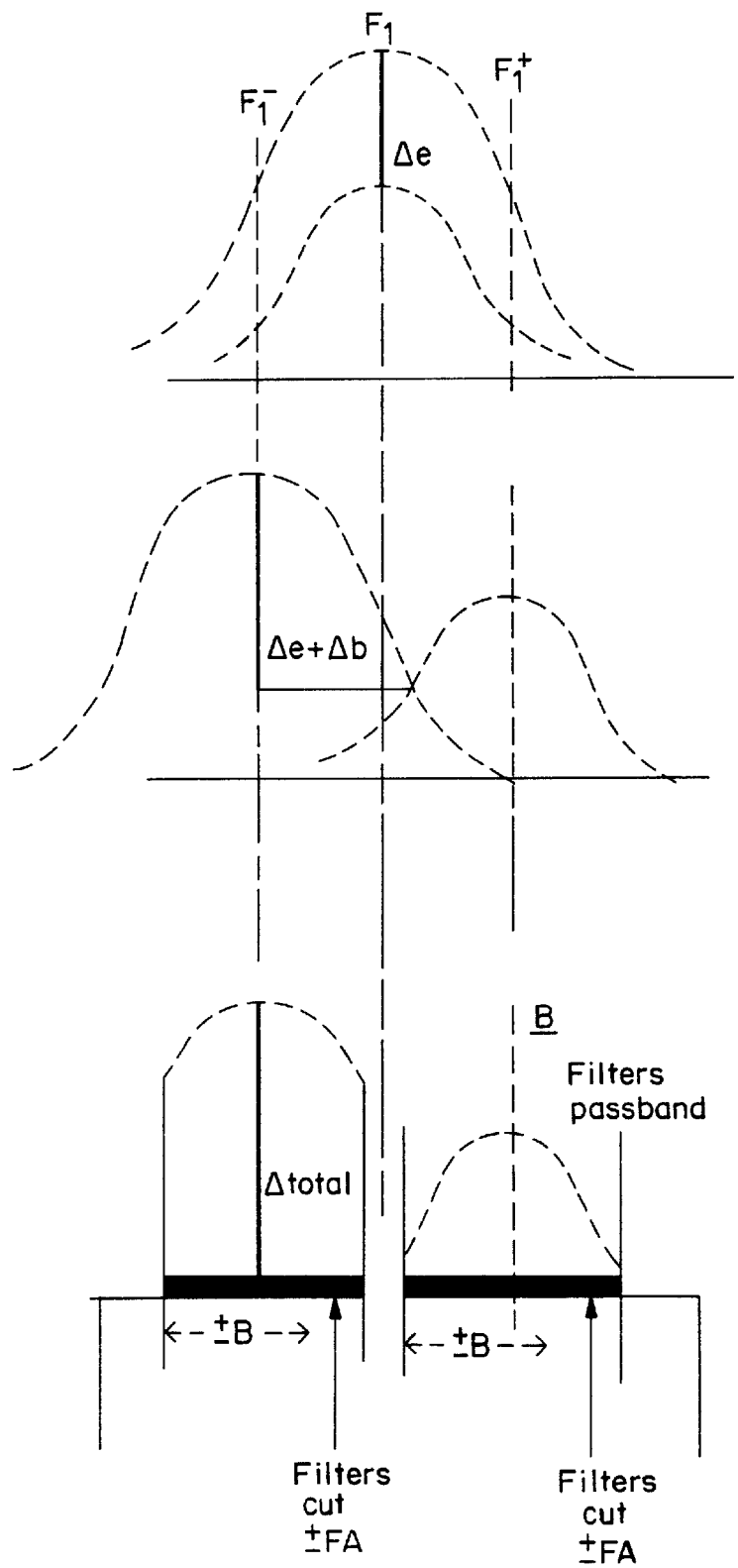
FIG. 4—diagram of the rejection process.

The FIG. 4 illustrates the diagram of the rejection process carried out by the system according to the present invention. As previously described, the inventive road radio cellular system comprises the simultaneous provision of directional antennas and a frequency off-set sub-system.

Thus, the directional antennas are successively disposed in such a way that their irradiation diagrams are not superimposed in the road axial direction, thus minimizing eventual interference areas. Said rejection is herein referred to as Δe or spatial rejection.

The $F_1$ frequency off-set system which sends the information signal to FM receivers in the vehicles driving along the road, designated as $F_1^+$, $F_1$, $F_1^-$, are spaced at ΔKHz of the so-called $F_1$ central carrier in such a way that the frequency modulation band of each carrier can have adjacent carriers with an additional rejection Δdb in relation to modulation bands. Said rejection Δdb is designed and calculated in such a way that the AFC (Automatic Frequency Control) circuit of the receivers in the vehicles can automatically detect the frequencies successively disposed in the many transceptors placed along the road so that people within the vehicles cannot perceive the differences when tuning the signal at $F_1$ and/or $F_1^+$ and $F_1^-$.

Therefore, the full rejection of the signal shall correspond to the spatial rejection Δe between the directional lobes of the transmitting antennas successively positioned along the road and rejection Δdb in FM receivers.

Thus, the system "minimizes" the interference of the signals sent between successive cells making the process viable, provided that use is made in the $F_1$ and $F_2$ transmission passband filters with FA band that limit the components intrinsically defined by the process usually used in frequency modulation is used, that is, the frequency deviation derived from the audio modulation process for FM of carriers $F_2^-$, $F_2$, $F_2^+$ is intrinsically limited in the process as a whole for the purpose of attaining the monophonic reception consistent with voice and music transmission required by the whole system.

The B band passband filters can be clearly inserted:
  (i) at the modulator inputs of $F_1$ and $F_2$ transmitters;
  (ii) adjacent to the outputs of $F_1$ and $F_2$ transmitters;
  (iii) simultaneously in all stages of the system described or in only one of such stages.

Thus, the transmission power of the cells successively positioned along the road are adjusted in terms of the soil topography and the consequent attenuation of the signal as a function of the soil profile and the full rejection defined by the collective effect of Δe and Δdb in the reception of the signal.

Therefore, said FIG. 4 illustrates, in this order, the curves of the effect of the directivity of antennas (Δe); the effect of the carrier frequency off set and the directivity of antennas (Δe+Δb); and the effect of carrier frequency off set, the directivity of antennas and passband filters (Δe+Δb+filter).

Although the road radio cellular system of the present invention has been described for the preferred embodiment as a system for help drivers on the road, it is to be understood that the present system can be useful in many other applications where a such system can be useful, such as schools, churchills, industries, villages, etc.

What is claimed is:

1. A road radio cellular system for providing useful information to road operators which comprises:
   a plurality of repeating stations; each repeating station being adapted to receive and transmit "Fi" frequencies; and
   a plurality of transmitting microcells in communication with at least one station, each microcell comprised of:
   a "Fi" frequency receiving antenna;
   a transceptor in communication with the "Fi" frequency receiving antenna, the transceptor having a "Fi" input and an 87.9 MHz output or another frequency output to be allocated to the system according to local regulation; and
   a transmitting antenna in communication with the transceptor, the transmitting antenna having vertically polarized directional diagram for transmitting frequencies within the 87.9 MHz range or another transmitting frequency to be allocated to the system according to local regulation; and
   a frequency off-set system whereby when at least one repeating station transmits an "Fi" frequency at least one microcell receives and converts "Fi" frequency into an 87.9 Mhz frequency or another frequency to be allocated to the system according to local regulation and transmits the converted frequency for reception by vehicle radios of vehicles traveling along the road, the microcells being configured, powered and arranged with respect to the topography of the road and expected type of road traffic traveling on the road to minimize potential interfering frequencies transmitted by the adjacent microcells or the non-adjacent and adjacent microcells while effecting a substantially imperceptible volume and frequency change of the transmitted frequencies as they are broadcast by vehicle radios to the road operators traveling along the road.

2. The system according to claim 1 wherein the microcells have a linear coverage in a range of about 2.5 km to about 20 km along the road.

3. The system according to claims 1 or 2 wherein the microcells allow for the reception of frequency modulated signals in the vehicle radios, the reception being monotonal in the 36KOF3EJN modulation process.

4. The system according to claim 3 wherein the 36KOF3EJN modulation process can be changed by the inclusion of coded signals to be also transmitted for eliminating the interference and interaction effects between microcells.

5. The system according to claim 1 wherein the microcells operate at a 87.9 MHz frequency and are actuated by a "Fi" frequency for repeating and distributing the information signal.

6. The system according to claim 1 wherein the number of "Fi" frequencies depends on the topographic profile of the road.

7. The system according to claim 1 wherein the repeating stations are interconnected with one another directly by cable or satellite.

8. The system according to claim 1 wherein at least one microcell is integrally assembled on a structure with a height of about 30 meters.

9. The system according to claim 1 wherein the microcells are powered by solar energy.

10. The system according to claim 1 wherein the transceptors comprise receivers operating in the "Fi" frequency range coupled to the transmitters operating in the 87.9 MHz range or another frequency to be allocated to the system according to local regulation, wherein each transceptor is provided with continuous operational adjustment of power in a range of about 0 to 750 mW, a carrier deviation with a ±200 KHz step adjustment for reducing the eventual interference between at least one microcell of the system without hampering the reception in receiving radios and a sub-carrier consistent with the system so that the highest intensity signal can automatically be the prevailing one.

11. A road radio cellular system for providing useful information to road operators which comprises:
   a plurality of repeating stations; each repeating station being adapted to receive and transmit "Fi" frequencies; and
   a plurality of transmitting microcells in communication with at least one station, each microcell comprised of:
   a "Fi" frequency receiving antenna;
   a transceptor in communication with the "Fi" frequency receiving antenna, the transceptor having a "Fi" input and an 87.9 MHz output or another frequency output to be allocated to the system according to local regulation; and a transmitting antenna in communication with the transceptor, the transmitting antenna having vertically polarized directional diagram for transmitting frequencies within the 87.9 MHz range or another transmitting frequency to be allocated to the system according to local regulation; and a frequency off-set system whereby when at least one repeating station transmits an "Fi" frequency at least one microcell receives and converts the "Fi" frequency into an 87.9 MHz frequency or another frequency to be allocated to the system according to local regulation and transmits the converted frequency for reception by vehicle radios of vehicles traveling along the road, the frequency off-set systems and transmitting antennas being configured, powered and arranged with respect to the topography of the road and excepted type of road traffic traveling on the road to minimize potential interfering frequencies transmitted by the adjacent microcells or the non-adjacent and adjacent microcells while effecting a substancially imperceptible volume and frequency change of the transmitted frequencies as they are broadcast by vehicle radios to the road operators traveling along the road.

* * * * *

UNITED STATES PATENT AND TRADEMARK OFFICE
CERTIFICATE OF CORRECTION

PATENT NO. : 6,389,263 B1
DATED : May 14, 2002
INVENTOR(S) : Erick Sergio Schmidt De Andrade It is certified that error appears in the above-identified patent and that said Letters Patent is hereby corrected as shown below:

<u>Title page,</u>
Please insert -- Foreign Application Priority Data [30] Dec. 22, 1997 [BR] Brazil…………………PI9706310-0 --.

Signed and Sealed this

Nineteenth Day of November, 2002

Attest:

Attesting Officer

JAMES E. ROGAN
Director of the United States Patent and Trademark Office